United States Patent Office 3,331,880
Patented July 18, 1967

3,331,880
PROCESS FOR PREPARING POLYFLUORO-
CYCLOHEXENES
Louis G. Anello, Basking Ridge, and Richard F. Sweeney, South Dover, N.J., assignors to Allied Chemical Corporation, New York, N.Y., a corporation of New York
No Drawing. Filed Feb. 10, 1965, Ser. No. 431,707
5 Claims. (Cl. 260—648)

This invention relates to a new process for preparing polyfluorocyclohexenes, and more particularly to the production of decafluorocyclohexene, with or without the production of monochlorononafluorocyclohexene.

Perfluorocyclohexene (decafluorocyclohexene) has been prepared in the past by the action of potassium fluoride on 1,2-dichlorooctafluorocyclohexene, and by passing fluorinated hydroaromatic compounds over nickel or iron gauze at elevated temperatures. Polyfluorochlorocyclohexenes containing two or more chlorine atoms have been produced in the past by fluorination of hexachlorobenzene with antimony pentafluoride. Such fluorinations, as carried out in the past, have consistently produced fluorochlorocyclohexenes containing no less than two chlorine atoms and no more than eight fluorine atoms; the primary products of such prior art fluorinations having been dichlorooctafluorocyclohexene and trichloroheptafluorocyclohexene, wherein two of the chlorines are attached to the doubly bound carbon atoms. Products of such fluorinations have failed to contain perfluorinated cyclohexene or monochlorononafluorocyclohexene.

The polyfluorocyclohexenes may be converted by high temperature defluorination to perfluorobenzene, a commercially available chemical with good solvent properties. The polyfluorocyclohexenes are useful intermediates in the production of thermally stable esters which in turn are useful additives in high temperature lubricants.

An object of the present invention is to provide a process for the conversion of polyfluorochlorocyclohexenes to polyfluorocyclohexenes containing no more than one chlorine atom.

Another object of the invention is to provide a new process for preparing perfluorocyclohexene.

These and other objects are accomplished according to our invention wherein a perfluorochlorocyclohexene containing two to three chlorine atoms, wherein two chlorine atoms are on adjacent carbons and the double bond is between such adjacent carbon atoms, is contacted at temperatures of at least about 120° C. with a substantial stoichiometric excess of antimony pentafluoride and wherein such temperatures and such excesses of antimony pentafluoride are maintained until the desired degree of fluorination has occurred. Thereafter the perfluorocyclohexene (decafluorocyclohexene) and/or monochlorononafluorocyclohexene may be recovered as by fractional distillation.

The process of our invention may be carried out using as starting mateiral either 1,2-dichlorooctafluorocyclohexene or a trichloroheptafluorocyclohexene having two chlorines on the doubly bound carbons, the third chlorine atom attached to a carbon atom other than the doubly bound carbons, or a mixture thereof, formed for example, as the end products in the prior art fluorination of hexachlorobenzene, the reaction proceeding according to the following scheme:

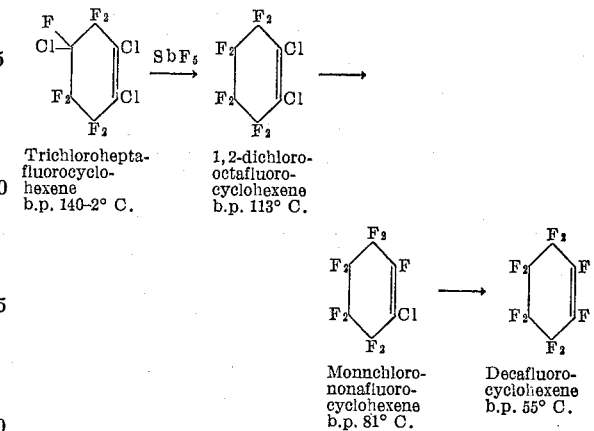

Trichloroheptafluorocyclohexene
b.p. 140-2° C.

1,2-dichlorooctafluorocyclohexene
b.p. 113° C.

Monnchlorononafluorocyclohexene
b.p. 81° C.

Decafluorocyclohexene
b.p. 55° C.

In carrying out the process of our invention, the reactants may be mixed in any desired manner so long as at least about 100% stoichiometric excess of antimony pentafluoride is provided and the temperature of bringing the reactants together is at least about 120° C. This can be effected, if desired, by heating both reactants to the indicated temperature and mixing the hot reactants in the required proportions. Or, more conveniently, the liquid antimony pentafluoride (B.P. 149.5° C.) may be heated to 120–150° C. and the chlorofluorocyclohexene at ambient temperatures may be added slowly to the hot antimony pentafluoride while maintaining the temperature of the mixture at the indicated value. Contact between the reactants is maintained until reaction has taken place, usually a period of between about 1 hour and about 5 hours, when the products of reaction can be recovered by distillation.

The process of the invention can be carried out batchwise or continuously. In continuous operation, two heated streams of reactants can be fed simultaneously to the reaction vessel, or preferably, a pool of liquid antimony pentafluoride may be heated to boiling or a few degrees below, and separate streams of chlorofluorocyclohexene and antimony pentafluoride, preferably both preheated, added to the reaction mixture which is maintained above the critical temperature, sufficient antimony pentafluoride being added to maintain a substantial stoichiometric excess in the mixture at all times. The reaction vessel can be arranged for distillation and the fluorinated products, decafluorocyclohexene (B.P. 55° C.) or a mixture thereof with monochlorononafluorocyclohexene (B.P. 81° C.) can be continuously removed from the reaction mixture.

In order to produce the highly fluorinated cyclohexenes as defined, it is essential that the liquid antimony pentafluoride reaction medium be maintained at a temperature of at least about 120° C. when contact is made with the fluorochlorocyclohexene and that a substantial stoichiometric excess of antimony pentafluoride be present at all times in the reaction mixture. Since only two of the five fluorine atoms of the antimony pentafluoride (SbF$_5$) are available for fluorination, the theoretical fluorine requirement is supplied by one mole of $SbF_5$ for every two atoms of chlorine to be replaced. Thus, if the starting material is trichloroheptafluorocyclohexene, 1.5 moles of $SbF_5$ per mole of starting material would be theoretically required to convert it to decafluorocyclohexene.

We have found, however, that use of stoichiometric quantities of $SbF_5$ fail to produce any detectable yields of perfluorocyclohexene or of monochlorononafluorocyclohexene from either of the indicated starting materials, and that a substantial excess of $SbF_5$ over the stoichiometric equivalent is essential for the production of these compounds. Thus we must use a stoichiometric excess of at least about 100%, preferably between about 100% and about 300% excess of available fluorine to replaceable chlorine. In terms of antimony pentafluoride, this amounts to a preferred ratio of between about 3 moles and about 6 moles of $SbF_5$ per mole of trichloroheptafluorocyclohexene used as starting material, or between about 2 moles and about 4 moles of $SbF_5$ per mole of dichlorooctafluorocyclohexene as starting material.

Temperature should be maintained at not below about 120° C., preferably between about 150° C. and about 250° C. Superatmospheric pressures may be used if required to maintain the desired temperature.

The following specific examples further illustrate our invention. Parts are by weight except as otherwise noted.

EXAMPLE 1

In a 1 liter, 3-necked flask fitted with thermometer, stirrer, condenser, and addition funnel, were placed 500 grams (2.59 moles) $SbF_5$, B.P. 149.5° C. The liquid $SbF_5$ was heated to 150° C., and 167 grams (0.536 mole) heptafluorotrichlorocyclohexene (B.P. 140–2° C.) were gradually added over a period of two hours. The reaction temperature slowly dropped to 114° C. and reflux was maintained for an additional three hours. The organic mixture was distilled away from the antimony halides, washed and dried. There were recovered 149 grams oil. Fractionation of this oil effected the recovery of 10 grams (0.038 mole, 7.1% yield) perfluorocyclohexene (B.P. 55° C.), 49 grams (0.18 mole, 34% yield) nonofluorochlorocyclohexene (B.P. 81° C.) and 90 grams (0.30 mole, 55% yield) octafluorodichlorocyclohexene, (B.P. 113° C.).

The reaction products were identified by their infrared spectra.

While the above describes the preferred embodiments of our invetnion, it will be understood that departures can be made therefrom within the scope of the specification and claims.

We claim:

1. The process for preparing perfluorocyclohexene which comprises contacting at temperatures of at least about 120° C. a chloroperfluorocyclohexene containing not more than three chlorine atoms, two of which are on adjacent carbon atoms and the double bond is between such adjacent carbon atoms, with a quantity of antimony pentafluoride sufficient to provide a substantial stoichiometric excess of fluorine with respect to the chlorine atoms in the chloroperfluorocyclohexene of at least about 100%, and maintaining said temperature and said excess of fluorine until reaction has taken place and thereafter recovering perfluorocyclohexene from the reaction mixture.

2. The process according to claim 1 wherein the chloroperfluorocyclohexene is 1,2,4 - trichloroheptafluorocyclohexene.

3. The process according to claim 1 wherein the chloroperfluorocyclohexene is 1,2 - dichlorooctafluorocyclohexene.

4. The process according to claim 1 wherein a stoichiometric excess of antimony pentafluoride of between about 100% and about 300% is used.

5. The process for preparing perfluorocyclohexene of the formula

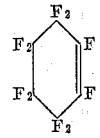

which comprises gradually adding a stream of 1,2,4-trichloroheptafluorocyclohexene to a quantity of liquid antimony pentafluoride, maintained at a temperature of at least about 120° C., in an amount between about three moles and about six moles per mole of 1,2,4-trichloroheptafluorocyclohexene, maintaining said reactants at said temperature for a period of at least about one hour and thereafter distilling perfluorocyclohexene from the reaction mixture.

References Cited

UNITED STATES PATENTS 3,024,290   3/1962   Henne _____ 260—648

OTHER REFERENCES

Hudlicky, "Chemistry of Organic Fluorine Compounds," page 64 (1962).

Leffler, "J. Org. Chem.," vol. 24, pp. 1132–1133 (1959).

LEON ZITVER, *Primary Examiner.*

MATTHEW M. JACOB, *Assistant Examiner.*